United States Patent [19]
Maritzen et al.

[11] Patent Number: 5,899,990
[45] Date of Patent: May 4, 1999

[54] JAVA-TO-DATABASE CONNECTIVITY SERVER

[75] Inventors: Lynn M. Maritzen, Fremont; Roland D. Dimaandal, Milpitas, both of Calif.

[73] Assignee: Sun Microsystems, Inc., Mountain View, Calif.

[21] Appl. No.: 08/831,453

[22] Filed: Mar. 31, 1997

[51] Int. Cl.⁶ .................................................. G06F 17/30
[52] U.S. Cl. ...................... 707/4; 707/4; 707/9; 707/10; 707/103; 707/201
[58] Field of Search .................... 707/9, 10, 4, 103, 707/201; 395/200.68

[56] References Cited

U.S. PATENT DOCUMENTS

| | | | |
|---|---|---|---|
| 5,263,165 | 11/1993 | Janis | 711/163 |
| 5,297,279 | 3/1994 | Bannon et al. | 707/103 |
| 5,701,461 | 12/1997 | Dalal et al. | 395/200.68 |
| 5,706,502 | 1/1998 | Foley et al. | 707/10 |
| 5,737,601 | 4/1998 | Jain et al. | 707/201 |
| 5,740,370 | 4/1998 | Battersby et al. | 395/200.49 |
| 5,745,703 | 4/1998 | Cejtin et al. | 395/200.68 |

FOREIGN PATENT DOCUMENTS

| | | | |
|---|---|---|---|
| 0 824 236 A2 | 2/1998 | European Pat. Off. | G06F 9/46 |
| 2 316 504 | 2/1998 | United Kingdom | G06F 15/18 |

OTHER PUBLICATIONS

Nick N. Duan, Distributed database access in a corporate environment using Java, Computer Networks and ISDN Systems 28 © 1996 pp. 1149–1156.

Sun Microsystems, Inc. *JDBC™ Guide: Getting Started*, Mar. 6, 1997, © 1996, 1997, XP–002069529.

Integrating Human Knowledge Into The Product Development Process, Oliver Tegel, pp. 93–100, ASME Jan. 1994.

Relational Database For SSC Design And Control, Barr et al., pp. 1666–1668, Dec. 1989 IEEE.

*Primary Examiner*—Thomas G. Black
*Assistant Examiner*—Shahid Alam
*Attorney, Agent, or Firm*—Skjerven, Morrill, MacPherson, Franklin & Friel LLP; Ken J. Koestner

[57] ABSTRACT

A Java™-to-Database Connectivity Server monitors client communications, accesses a database such as a Sybase relational database, upon client command establishes a connection to the database, accesses requested data from the database, manipulates the data, and relays the data to the client. The Java™-to-Database Connectivity Server is programmed in the Java™ programming language to facilitate communications with Java™ clients using Java™ sockets. The Java™-to-Database Connectivity Server includes an Applications Programmer Interface (API) on the server side of a client/server interface and implementation of System Query Language (SQL) queries on the client side. The Java™-to-Database Connectivity Server supplies an interface between Java™ applications and database servers using an easy-to-use Java™ server Applications Programmer Interface (API) forming a uniform framework for building or integrating database connectivity across organizations and companies globally. A single API supplies connectivity with a database, for example, with Oracle or Sybase database servers. In some embodiments, the Java™-to-Database Connectivity Server is platform-independent and usable on any platform in any usage model (nomadic, remote access, Internet, and Intranet, for example), and encoded entirely in the Java™ programming language using sockets and multi-threading.

46 Claims, 4 Drawing Sheets

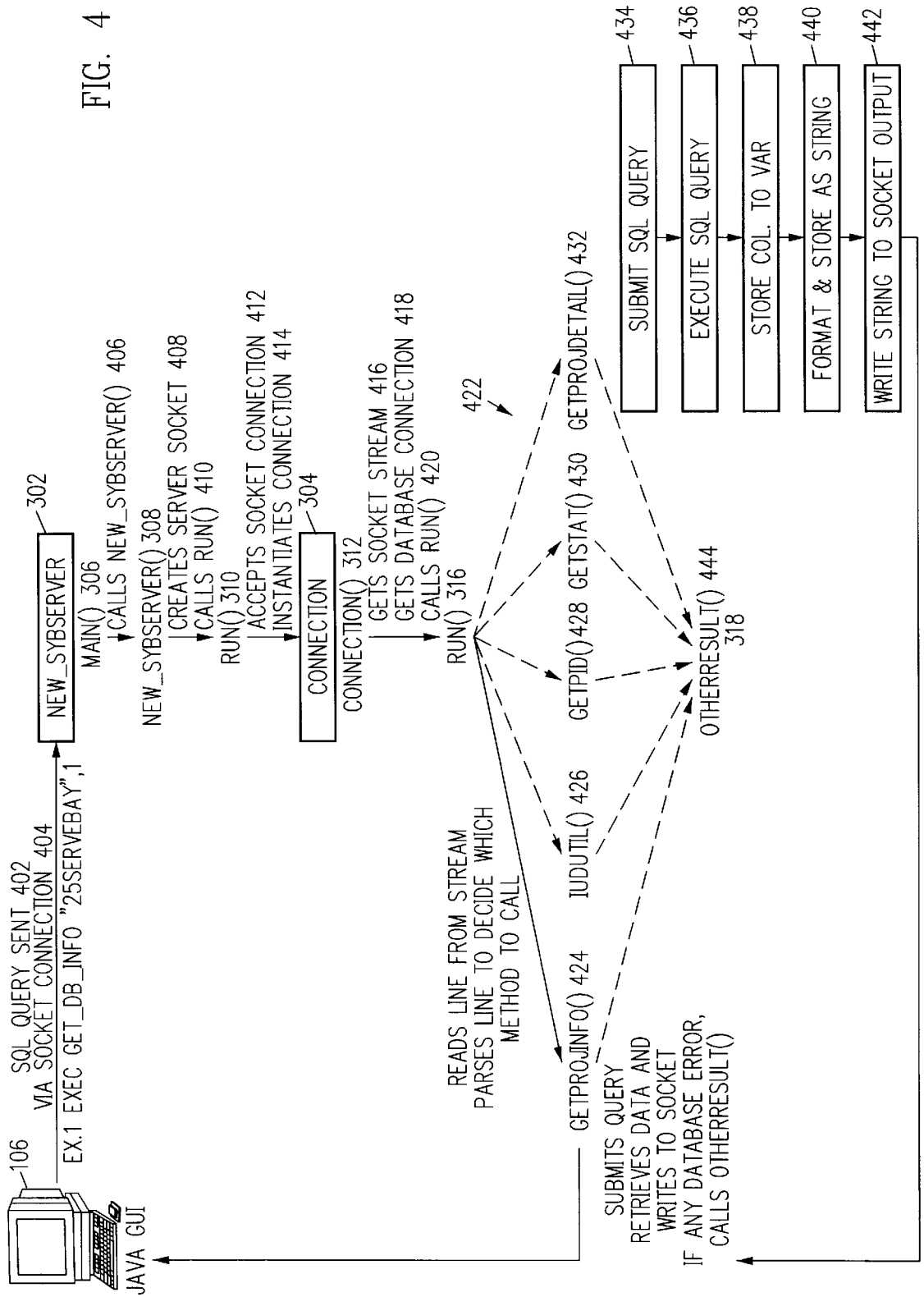

JAVA-TO-DATABASE CONNECTIVITY SERVER

BACKGROUND OF THE INVENTION

1. Field of the Invention

The present invention relates to information service technology. More specifically, the present invention relates to a system and operating method for connecting an application or applet to a database.

2. Description of the Related Art

The Internet is regarded by many as the fastest growing market on Earth. In the 1990s, the number of Internet users has grown exponentially. In June of 1995, an estimated 6.6 million hosts were connected, an increase of nearly 5 million hosts in a mere six months. The current growth rate on the Internet is approximately 75% per year. In June of 1995, the 6.6 million hosts included approximately 120,000 networks and over 27,000 web servers. The number of web servers is doubling approximately every 53 days.

Various technical innovations have proven highly suited to the Internet environment. For example, in 1990 programmers at Sun Microsystems developed a universal programming language, eventually known as "the Java™ programming language". Java, SpecJava, Sun, Sun Microsystems and the Sun Logo are trademarks or registered trademarks of Sun Microsystems, Inc. in the United States and other countries. All SPARC trademarks are used under license and are trademarks of SPARC International, Inc. in the United States and other countries. Products bearing SPARC trademarks are based upon an architecture developed by Sun Microsystems, Inc.

The Java™ programming language resulted from programming efforts intended for coding in the C++ language. The Java™ programming language thus has many commonalities with C++ but is further regarded as a simple, object-oriented, distributed, interpreted yet high performance, robust yet safe, secure, dynamic, architecturally neutral, portable, and multi-threaded language. The Java™ programming language has emerged as the programming language of choice for the Internet. Many large software and hardware companies have licensed the Java™ programming language from Sun Microsystems.

The Java™ programming language is designed to solve several problems in modern programming practice. The Java™ programming language omits many rarely-used, poorly-understood, and confusing features of C++. The omitted features primarily concern operator overloading, multiple inheritance, and extensive automatic coercions. The Java™ programming language includes automatic garbage collection to simplify the task of Java™ programming and avoiding memory allocation and deallocation as in C++. The Java™ programming language eliminates the usage of pointers, instead supporting true arrays having array boundaries which are explicitly checked. The elimination of pointers eliminates vulnerability to many viruses and bugs. The Java™ programming language includes objective-C interfaces and specific exception handlers.

The Java™ programming language has an extensive library of routines for coping easily with TCP/IP protocol (transmission control protocol based on internet protocol) and FTP (file transfer protocol). The Java™ programming language is intended for usage in networked/distributed environments. The Java™ programming language facilitates the construction of virus-free, tamper-resistant systems. Authentication techniques supported by the Java™ programming language are based on public-key encryption.

One highly advantageous aspect of the Internet is the accessibility of databases to the network. Databases are collections of data configured with a structure for accepting, storing, and providing, on demand, data for single or multiple users. The combination of networks for facilitating information transfer to many users and databases for supplying large amounts of data to the many users are naturally synergistic. Unfortunately, since the Java™ programming language is a relatively new programming language, direct access connections between the Java™ programming language and databases have not yet been developed so that the Java™ programming language cannot directly access a database. Accordingly, an important technical issue is the connectivity of Java™ applications and applets to databases. Connectivity is the capability of a system or device to be attached to other systems or devices without modification. As system development organizations begin to migrate to Java™ /Web-enabled environments, the connectivity of Java™ application and applet connectivity to various databases becomes highly advantageous.

What is needed is a highly efficient, powerful and usable system and operating method for executing database transactions between a Java™ front-end and a standard System Query Language (SQL)-type database.

Although Java™ applications can be programmed to communicate with databases using interfaces such as CGI-BIN, typical object-oriented techniques, and C/C++ solutions, the amount of program code development and interfacing effort using these techniques is substantial and, in some cases, essentially prohibitive.

Therefore, a system and operating method that facilitates interfacing between databases and Java™ applications or applets and minimizes the amount of application code for forming the interface is highly advantageous.

SUMMARY OF THE INVENTION

In accordance with the present invention, a Java™-to-Database Connectivity Server monitors client communications, accesses a database such as a Sybase relational database, upon client command establishes a connection to the database, accesses requested data from the database, manipulates the data, and relays the data to the client. The Java™-to-Database Connectivity Server is programmed in the Java™ programming language to facilitate communications with Java™ clients using Java™ sockets. Java™ sockets are standard interprocess communication functional elements within the Java™ programming language and are well-known in the software arts to software engineers and designers who design and implement Java™ applications.

In accordance with the present invention, a Java™-to-Database Connectivity Server achieves connectivity between Java™ applications or applets and a standard database using an Applications Programmer Interface (API) on the server side of a client/server interface and an implementation of System Query Language (SQL) queries on the client side.

In accordance with one aspect of the present invention, a Java™-to-Database Connectivity Server supplies an interface between Java™ applications and database servers using an easy-to-use Java™ server Applications Programmer Interface (API) forming a uniform framework for building or integrating database connectivity across organizations and companies globally. The Java™ server API advantageously reduces the development time for interconnecting Java™ applications and applets with databases, accelerates the learning curve for operating the interface, and reducing training costs. A single API supplies connectivity with a database, for example, with Oracle or Sybase database servers, thereby simplifying the interconnection of a particular database. In some embodiments, the Java™-to-Database Connectivity Server is platform-independent and usable on any platform in any usage model (nomadic, remote access, Internet, and Intranet, for example). In some embodiments, the Java™-to-Database Connectivity Server is encoded entirely in the Java™ programming language using sockets and multi-threading, attaining the performance, safety, and security advantages of a Java™ system.

The Java™-to-Database Connectivity Server is used in Management Information Systems/Information Retrieval (MIS/IR) environments to connect networks to databases, thereby accelerating the migration of legacy software, new development programs, and software systems to Java™ and Web-enabled environments.

In accordance with an embodiment of the present invention, a server for attaching a Java™ application to a database includes a generic database server class having a database server instantiator with executable program code for instantiating instances of the database server, an instance of the database server class with a connection class constructor and a server socket creator, and a connection class instantiator with a server socket acceptor. The server also includes a generic connection class having an instance of the connection class with a database connection constructor and a socket stream creator, a creator of input and output socket streams, a creator of a database connection, a database connection including executable program code for database processing and data formatting of database information, and input and output socket streams including executable program code for transmitting the database information.

Many advantages are achieved by the described Java™-to-Database Connectivity Server system and operating method. One advantage is that the Java™-to-Database Connectivity Server supplies a universal API, thereby reducing the amount of coding and development time to allow communication of Java™ applications and applets with databases. Another advantage is that the Java™-to-Database Connectivity Server is predominantly implemented in the Server side of a Client/Server interface, reducing the amount of application program development on the Client portion of the interface since the universal API is supplied as an interface, accelerating the learning curve for operating the interface, and reducing training costs.

It is advantageous that the server side of a client/server interface is supplied by the Java™-to-Database Connectivity Server alone so that a user interface involves interactions with only a single set of software and hardware constructs. It is advantageous that the API resolves essentially all interfacing issues so that the Java™-to-Database Connectivity Server involves virtually no overhead for installation or usage. It is advantageous that both the client side and the server side of the interface are developed using the Java™ programming language so that the advantages of the Java™ language are attained on both sides of the interface.

It is advantageous that the Java™-to-Database Connectivity Server facilitates automation and software technology providing a framework for global standardization of business processes associated with Java™ applet/application program development for accessing a relational database. The resulting standardized processes create a significant reduction in operational and development infrastructure advantageously promoting code sharing and reusability.

BRIEF DESCRIPTION OF THE DRAWINGS

The features of the described embodiments believed to be novel are specifically set forth in the appended claims. However, embodiments of the invention relating to both structure and method of operation, may best be understood by referring to the following description and accompanying drawings.

FIG. 4 is a schematic data flow diagram illustrating an example of operations performed by the illustrative JDCS to search and retrieve information requested by the Java™ GUI from a relational database.

DETAILED DESCRIPTION OF THE PREFERRED EMBODIMENTS

Figure 1:
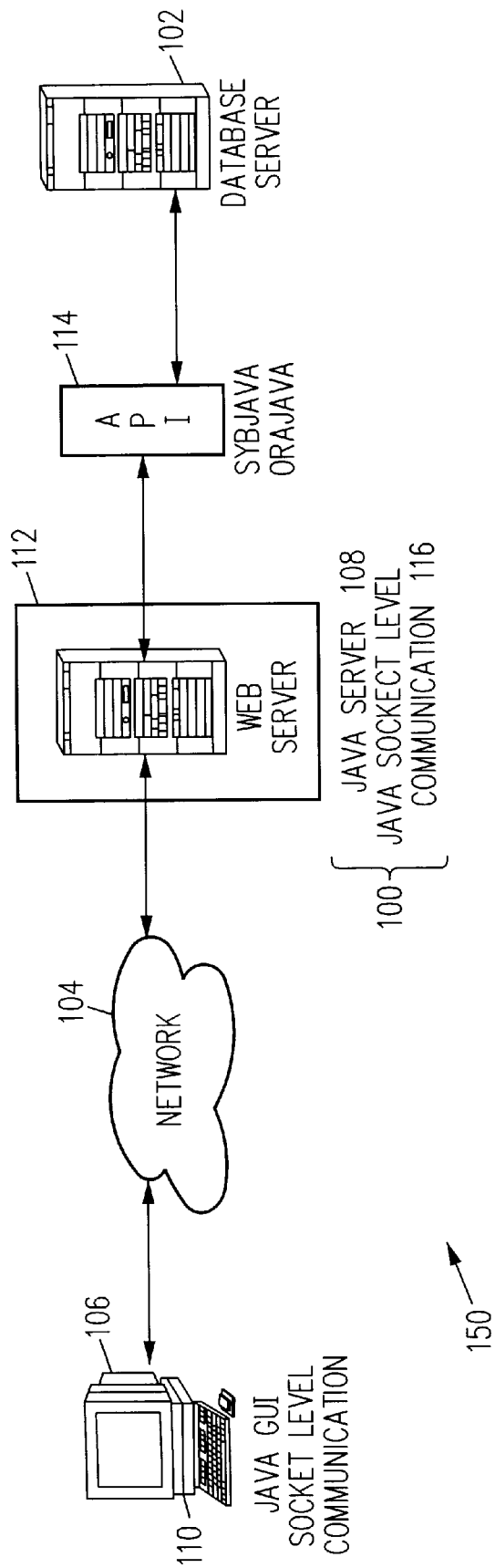
FIG. 1 is a pictorial schematic block diagram showing a suitable communication environment for utilizing a Java™-to-Database Connectivity Server (JDCS).

Referring to FIG. 1, a pictorial schematic block diagram showing a suitable communication environment 150 for utilizing a Java™-to-Database Connectivity Server (JDCS) 100. The JDCS 100 is a software interface between a database server 102 and Java™ programs, including applications and applets. The JDCS 100 typically and most usefully supports communications of Java™ applications and applets executing on a Java™ Graphical User Interface (GUI) 106 platform through a network 104 to the database server 102. The Java™ GUI 106 and the JDCS 100 are associated in a client/server relationship in which the Java™ GUI 106 is a client process executing on a computer system 110 that exchanges data via a communication stream, such as a network 104, with the Java™ Server 108, a server process executing on another computer, for example a Web server 112.

An illustrative communication environment 150 includes the computer system 110 connected to a database server 102 through the network 104, the Web server 112, and an Applications Programmer Interface (API) 114. The computer system 110, illustratively a personal computer, a desktop computer, a laptop computer, a workstation or the like, executes Java™ applications and applets in conjunction with the Java™ GUI 106. Typically, the Java™ GUI 106 is encoded in the SpecJava™ programming language and environment, version 0.3-E. SpecJava™ is a GUI builder which generates Java™ code based on a Java™ Abstract Windowing Toolkit (AWT) toolset.

The network 104 is generic configuration of data processing devices and software connected for the exchange of information including various public and private networks. Suitable networks include Internet, Intranet or local area networks. For a local network, the JDCS 100 is contained in the same network as the application or applet. The Web server 112 is a hardware network interface server for executing software including a Java™ Server 108 and Java™ socket-level communications 116. Typically, client and server software including the Java™ Server 108 and the Java™ socket-level communications 116 are encoded in the Java™ programming language and environment, version 1.0.. Both client and server applications are developed using Java™ as the programming language and using the Java™ Developer's Kit 1.0 to compile the program code. The Java™ Server 108 and the Java™ socket-level communications 116 are constrained to execute on the Web server 112 under operating standards placed on Java™ browser programs, such as Netscape, which evoke a security violation in response to an attempt to execute from an unauthorized device.

The database server 102 is a conventional database server which is available from various vendors. Database servers include, for example, an Oracle database server (Version 7.3) and a Sybase database server (System 11). The API 114 is a generic relational database API for communicating with the database server 102. The API 114 is vendor-independent and includes a plurality of vendor-specific API sections including, for example, an Oracle API section for communicating with an Oracle database server and a Sybase API section for communicating with a Sybase database server. Generally, the API 114 is a standard Applications Programmer Interface which is used by Java™-to-Database-Connectivity-Server application without modification. The Java™ Server 108 communicates with the API 114 using standard Java™ libraries which implement a native method of calling C++ programming language routines. The Oracle database server and the Sybase database server execute using a set of C++ libraries that are compatible with the Java™ libraries so that data communication between the Java™ Server 108 and the API 114 is facilitated.

In the illustrative embodiment, the JDCS 100 supports communication between the Java™ GUI 106 and the database server 102 using a communication protocol that is based on Java™ sockets, the Java™ socket-level communications 116 for executing by the Web server 112. In other embodiments, interprocess communication methods other than socket methods may be used. Java™ socket methods in accordance with the Java Developers Kit (JDK) 1.0 java.net class hierarchies are used to establish communication between client and server. The JDCS 100 uses a generic relational database for communications between the Java™ GUI 106 and the database server 102.

The JDCS 100 performs low-level communication using sockets. A socket is an abstraction of an input file or an output file which is accessed using standard input and output file operations while communications are accomplished to a remote socket in a remote location via the network. Java™ socket-level communications 116 are established by programming which defines a java net ServerSocket class. In general, socket communications are established using a "listener" process (typically a main( ) program) which spawns threads to service the needs of a client process. By spawning threads, a plurality of which may be active at one time, the main( ) routine returns to a "listening" state while a thread is executing. The JDCS 100 uses the ServerSocket class to accept connections from clients. When a client connects to a communication terminal upon which a ServerSocket is "listening", the ServerSocket allocates a new Socket object which is connected to a new terminal to achieve Client communications. The server then returns to a "listening" operation to detect subsequent Client requests.

Figure 2:
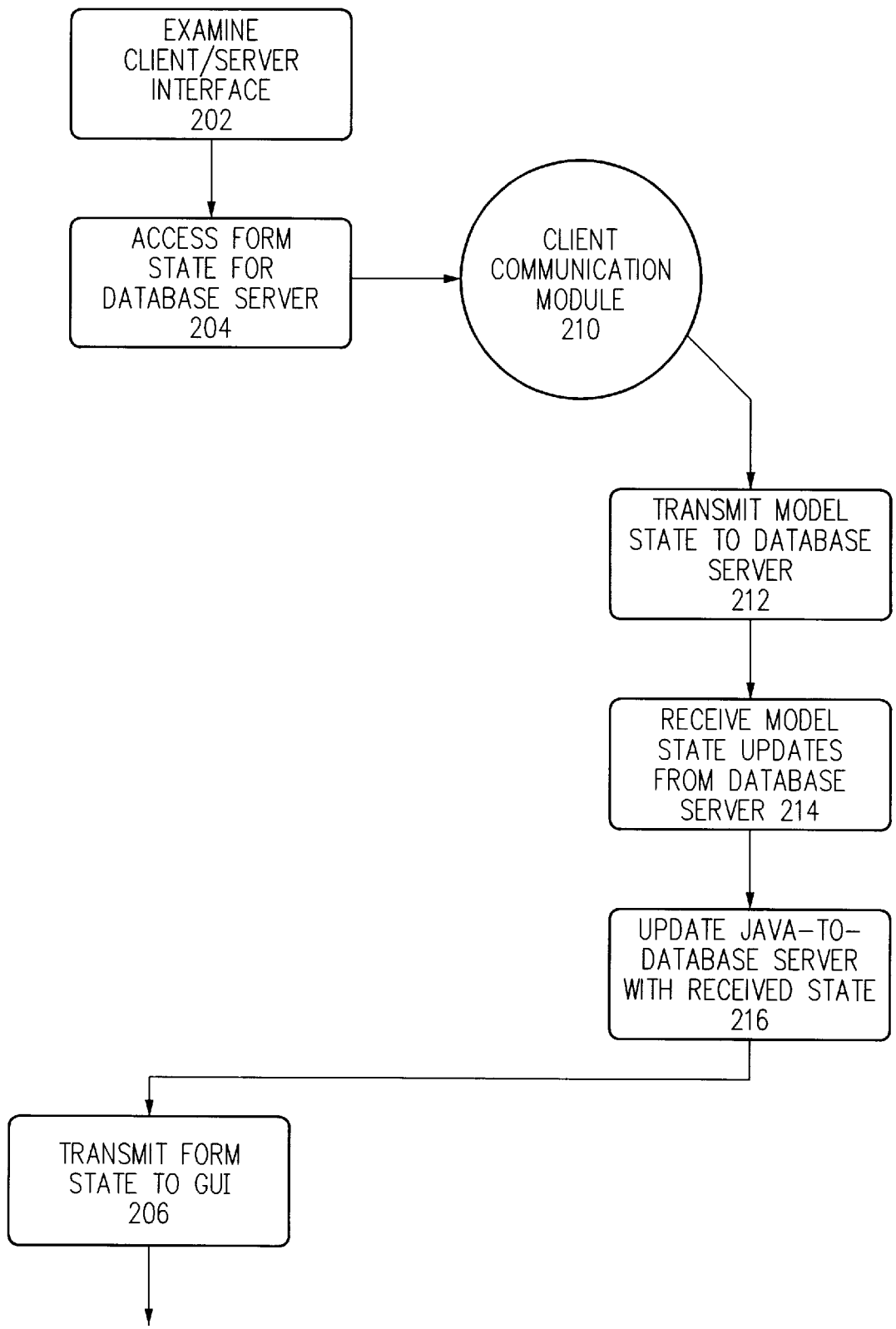
FIG. 2 is a flow chart illustrating operations performed by the JDCS.

Referring to FIG. 2 in conjunction with FIG. 1, a flow chart illustrates operations performed by the JDCS 100. The JDCS 100 manages communications between the Java™ GUI 106 and the database server 102 based upon the usage of Java™ socket-level communications 116 and usage of a generic relational database API 114 to communicate to the database server 102.

Java™ application codes and applets executing on the computer system 110 in conjunction with the Java™ GUI 106 examine the state of the client/user interface in an operation 202, interact with the database server in operation 204 to access a new form state, and transmit the new form state in operation 206 to the Java™ application or applet which originated the client request. The Java™ application codes and applets examine the state of the client/user interface by parsing the data command, determining the System Query Language (SQL) command and arguments to be transferred. The form state is the data as a collection of attributes and values, arranged in rows and columns, that is accessed from a database.

The JDCS 100 models the state of the form as a collection of named attributes and values. One example of a typical attribute is a GUI widget. The value of the GUI widget represents the current form state of the widget. The JDCS 100 also mutually updates the model at the direction of the Java™ GUI 106 and updates the Java™ GUI 106 when the model is changed by the database server 102.

The named attributes and values are updated based on an event-driven model and therefore occur in real-time. The JDCS 100 accommodates field-based events as well as form-based events.

The operation 204 of interacting with the database server to access a new form state utilizes a client communication module 210 for transmitting the state of the model in operation 212 to the database server 102 and receiving updates in operation 214 from the database server 102. In operation 216, the client communication module 210 also reflects the state between the Java™ GUI 106 and the database server 102 on each client/server interaction.

Figure 3:
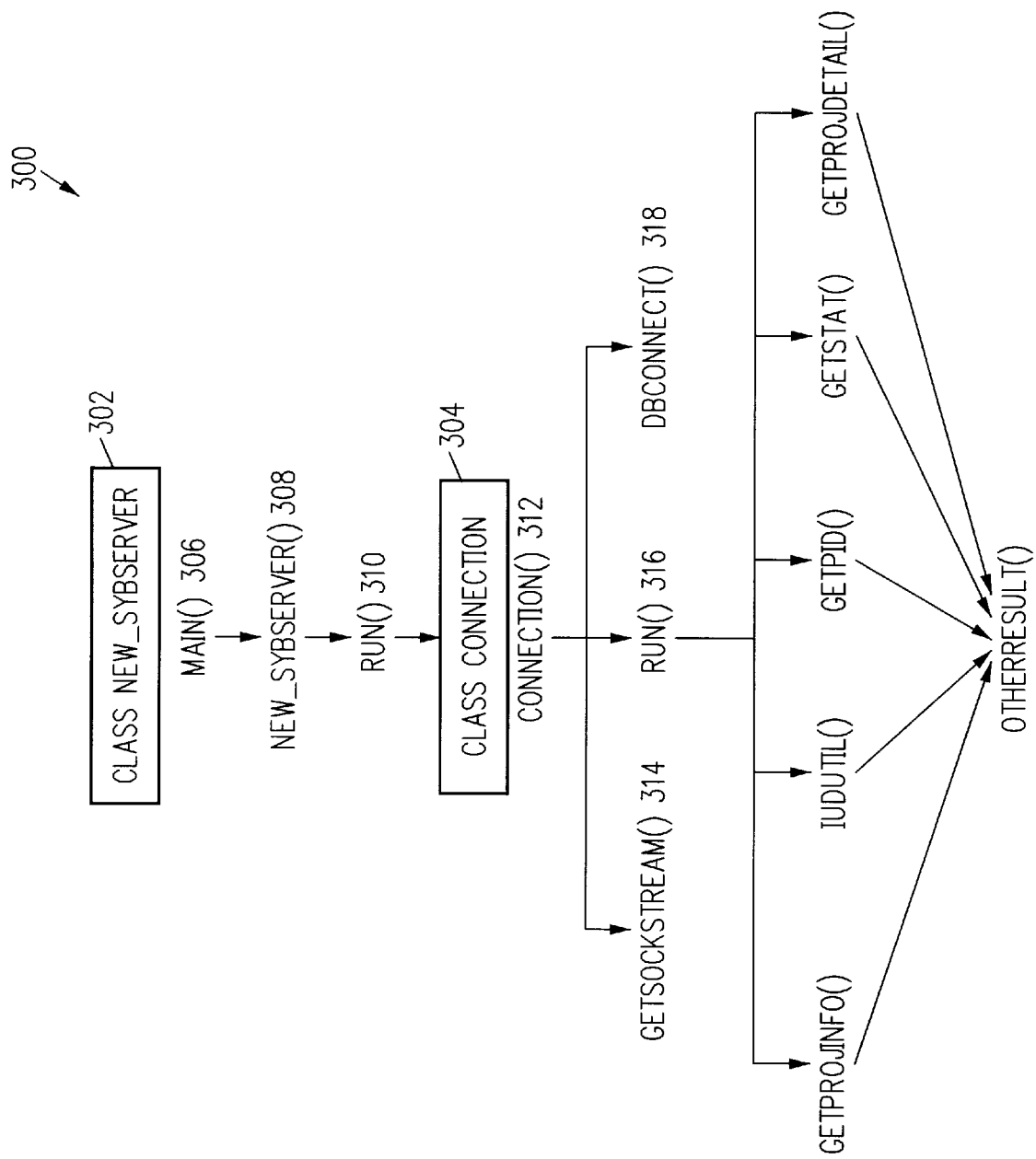
FIG. 3 is a schematic hierarchy diagram depicting various classes and methods in an embodiment of the JDCS implementing a Sybase server.

Referring to FIG. 3, a schematic hierarchy diagram 300 depicts various classes and methods in an embodiment of the JDCS 100 implementing a Sybase server. The Sybase server is illustrative of a suitable database for accessing using the JDCS 100. Other databases may also be used, including an Oracle database, for example. In the illustrative embodiment, the relational database model is based on a single-master repository with geo-specific replicated, distributed database servers in a three-tier client/server implementation. Other suitable database models that are known in the information systems art may be utilized in other embodiments.

The JDCS 100 includes two classes for the specific example of a Sybase server (sybServer). A first class is a Class new_sybServer 302, and a second class is a Class Connection 304.

The Class new_sybServer 302 is a generic class containing main driver routines for Sybase applications. Methods in the Class new_sybServer 302 perform operations including creating a server socket, and initiating a thread for socket communication and database connections. Methods defined for the Class new_sybServer 302 include a main( ) method 306, a new_sybServer( ) method 308 and a run( ) method 310. The main( ) method 306 is a "listening" process which instantiates instances of the Class new_sybServer 302 thereby spawning threads for performing a plurality of communication streams in parallel. The main( ) method 306 instantiates the Class new_sybServer 302, a database server, so that the main( ) method 306 may be termed a "database server instantiator".

The new_sybServer( ) method 308 is a class constructor of the Class Connection 304 for creating a server socket and calling the run( ) method 310. The run( ) method 310 accepts the socket connection and instantiates the Class Connection 304. Several variables are defined for the Class new_sybServer 302 including a Sybjava variable "dbproc" for defining database connections, a ServerSocket variable "s" for defining a server socket which is used in a currently executing program, and a sockIO variable "sio" which is used to instantiate a sockIO class interface.

The Class Connection 304 is a generic class that performs essentially all communication management operations of the JDCS 100. The Class Connection 304 contains all methods that are used for database processing, data formatting, and transmitting data from the database server 102 to the client Java™ GUI 106. Methods defined for the Class Connection 304 include a Connection( ) method 312, a getSockStreams( ) method 314, a dbConnect( ) method 316, and an otherResult( ) method 318. The Connection( ) method 312 is a Class constructor that instantiates instances of the Class Connection 304 and establishes a database connection as directed by the Java™ GUI 106, creates a socket stream, and calls the run( ) method 310. The Connection( ) method 312 creates a socket stream and may be termed a "server socket creator" or "server interprocess communication creator".

The getSockStreams( ) method 314 creates input and output socket streams. The dbConnect( ) method 316 creates a Sybase database connection. The otherResult( ) method 318 notifies the client Java™ GUI 106 when a database transaction has failed for any reason. Several variables are defined for the Class Connection 304 including a String variable "debug" for holding a character string assigned to a command line argument "DEBUG", a String variable "uid" for holding a character string designating a database user ID, a String variable "srv" for holding a character string designating a database server name, a String variable "db" for holding a character string designating a Sybase database name, and a String variable "app" for holding a character string assigning an internal name to an application. Additional variables defined for the Class Connection 304 include a String variable "inf" for holding a character string designating a directory path to the Sybase interfaces file, a Socket variable "so" identifying a socket used for the class within which the "so" variable is defined, and a Sybjava variable "dbproc" for defining database connections. Other variables defined for the Class Connection 304 include a String variable "qry" designating a character string for storing System Query Language (SQL) queries, a String variable "inputLine" designating a character string for storing a line of input read from the socket stream, a StringBuffer array "inBuf" designating a buffer storage for storing all lines read from the socket stream, and a String variable "sendrec" designating a character string for storing a formatted string record that is sent to the client Java™ GUI 106. Further variables defined for the Class Connection 304 include a PrintStream variable "outS" which is assigned a handle of the output stream of a socket, a DataInputStream variable "sIn" which is assigned a handle of the input stream of a socket, a sockIO variable "sio" which is used to instantiate a sockIO class interface, and a Boolean variable "isDone" which is used as a completion flag for a thread delay loop.

Referring to FIG. 4, a schematic data flow diagram illustrates an example of operations performed by the illustrative JDCS 100 to search and retrieve information requested by the Java™ GUI 106 from a relational database. In general, upon an occurrence of a defined event, a user initiates a request via the Java™ GUI 106 to extract data from a database, update data in the database or modify data in the database. The user sends a command via the Java™ GUI 106 using socket-level communications to the Java™-to-Database Connectivity Server. The command includes a SQL query that identifies the operation to be performed and arguments to the command. The Java™-to-Database Connectivity Server executes the requested database operation, generally a data retrieval or modification and returns extracted data to the Java™ GUI 106. In the case of an error, such as a database error, an error status is returned from the database to the Java™ GUI 106.

The JDCS 100 supplies an interface between client and server based on Java™ sockets which, in turn, utilize network protocols such as TCP/IP networking protocols. The TCP/IP protocol advantageously supports standard encryption technologies including data encryption standard (DES) and PGP (pretty good privacy). A client program sends SQL queries 402 to the server via the Java™ socket-level communications 116 interface. Each query is received by the server in the form of a socket connection 404. The query is then submitted to the database server 102 via a database connection 416. If any rows are transferred from the database server 102 to the Java™ GUI 106, the returned rows are processed sequentially and returned to the client via the socket interface.

The Java™ GUI 106 originates a System Query Language (SQL) query 402, thereby issuing a command to the JDCS 100. The SQL query is sent via socket connection 404 to the Class new_sybServer 302. An illustrative SQL query is the command "exec get_db_info"25SERVEBay", 1", where the statement "25SERVEBay" is an identifier argument to the command and the number 1 is a flag argument to the command. The Class new_sybServer 302 begins execution of the main( ) method 306 which, in step 406, calls the new_sybServer( ) method 308. The main( ) method 306 "listens" for a command and is activated at the posting of the command by the Java™ GUI 106.

The new_sybServer( ) method 308 creates a server socket 408 and calls the run( ) method 310 in step 410. The run( ) method 310 accepts the socket connection 412 that is created in step 408 and instantiates the Class Connection 304 in step 414. The run( ) method 310 instantiates the Class Connection 304 and may be termed a "connection class instantiator". The run( ) method 310 accepts the socket connection 412 and may be termed a "server socket acceptor". The Class new_sybServer 302 monitors to detect socket connections and, once a connection is established, the Class Connection 304 is instantiated.

The Class Connection 304 executes the Connection( ) method 312, a class constructor which in step 416 creates a socket stream, constructs a database connection and calls the run( ) method 310. The run( ) method 310 in the Class Connection 304 submits the SQL query to the database. In particular, the run( ) method 310 reads a line from the socket stream 418 and parses the line to determine which method to call 420. Depending on the input line, an SQL query, the run( ) method 310 determines which method in the Class Connection 304 to invoke. The run( ) method 310 activates a database retrieve operation executing in the API 114, retrieves data that is produced by the API 114, formats the data, and writes the formatted data back to the Java™ GUI 106 via a return socket connection.

The run( ) method 310, as directed by the SQL query, calls and executes a method 422 selected from among the methods of a getProjInfo( ) method 424, an iudUtil( ) method 426, a getPid( ) method 428, a getstato method 430, and a getProjDetail( ) method 432.

In general, the run( ) method 310 is an application server routine that updates the server's model of the form which is, in turn, transmitted back to the client by the server communication module. The application server routine normally does not invoke any client/server interactions but simply facilitates the transfer of database information.

More specifically, when the selected method of the Class Connection 304 is called, the method is passed a string in the form of a SQL query. The run( ) method 310 submits the SQL query to the selected method in step 434. The selected method processes incoming rows from the database. The selected method executes the SQL query 436, thereby accessing or extracting designated columns and rows of the database. The selected method stores selected columns into variables 438 for each row that is returned from the database. The selected method formats the retrieved columns 440 in accordance with a designation of the received SQL query and stores the retrieved columns in the form of a String. The selected method writes the formatted String to the socket output stream 442 and processes a next record by branching to step 436. If the selected method detects a database error, in step 444 the method calls the otherResult( ) method 318. The otherResult( ) method 318 displays any error message or processing status encountered while processing a user request. When the SQL query is satisfied, control is returned to the Java™ GUI 106.

In the illustrative embodiment, the getProjInfo( ) method 424, the iudUtil( ) method 426, the getPido method 428, the getStat( ) method 430, and the getProjDetail( ) method 432 are methods for retrieving information from a database. Generally, the differences between the illustrative methods is a difference in the number of columns extracted from the retrieved rows and the manner in which the columns are formatted for transmission to the client Java™ GUI 106. Specifically, the getProjInfo( ) method 424 expects two columns per row retrieved. The iudUtil( ) method 426 executes an SQL query but expects no rows retrieved. The getPid( ) method 428 expects one column per row retrieved. The getStat( ) method 430 expects nine columns per row retrieved. The getProjDetail( ) method 432 expects ten columns per row retrieved. In addition to designating the number of columns to be retrieved, the information retrieval messages designate which rows are to be retrieved.

In the illustrative embodiment, a shell script (not shown) is used to automatically start the Class new_sybServer 302 when the Class new_sybServer 302 terminates execution for any reason. The shell script defines environmental variables including SYBASE, LD_LIBRARY_PATH and JAVA_HOME. SYBASE is a variable defining the directory path to interface files of Sybase. LD_LIBRARY_PATH is a variable defining the directory path to UNIX system's utility libraries. JAVA_HOME is a variable defining the Java software home directory path. A spotServer.sh script (not shown) may be invoked in the startup script of any system during rebooting so that Class new_sybServer 302 is available for execution at the time of system startup.

While the invention has been described with reference to various embodiments, it will be understood that these embodiments are illustrative and that the scope of the invention is not limited to them. Many variations, modifications, additions and improvements of the embodiments described are possible. For example, although the Java™-to-Database Connectivity Server is explicitly described as communicating with Sybase and Oracle databases, other databases are applicable to Java™ interfacing.

Furthermore, the illustrative embodiment shows a Web server 112 which is connected directly to a database server 102 in a local network. In other embodiments, the Web server 112 and the database server 102 may be connected via a network such as Internet, Intranet or local area networks. Accordingly, the JDCS 100 supports many different topology/usage models including remote/nomadic access models as well as standard connected access models.

Although the illustrative embodiment shows named attributes and values that are updated based on form-based events, updating based on field-based events is also supported.

Accordingly, the present invention is defined solely by the claims which follow and their full range of equivalents.

What is claimed is:

1. A server for connecting an application to a database comprising:
    program code defining a generic database server type including:
        a database server instantiator including executable program code for instantiating instances of the database server type;
        an instance of the database server type including a connection type constructor and a server interprocess communication creator; and
        a connection type instantiator including a server interprocess communication acceptor; and
    program code defining a generic connection type including:
        an instance of the connection type including a database connection constructor and a interprocess communication stream creator.

2. A server according to claim 1, wherein the generic connection type further includes:
    a creator of input and output interprocess communication streams;
    a creator of a database connection;
    a database connection including executable program code for database processing and data formatting of database information; and
    input and output interprocess communication streams including executable program code for transmitting the database information.

3. A server according to claim 1, further comprising:
    a interprocess communication level communication input connection coupled to the database server instantiator, the interprocess communication level communication input connection for carrying a database query, the database server instantiator being activated by a database query.

4. A server according to claim 3, wherein:
    the database query is a System Query Language (SQL) query.

5. A server according to claim 1, wherein:
    the application is a Java™ application; and
    the interprocess communication level communication input connection is coupled to a Java™ Graphical Users Interface (GUI).

6. A server according to claim 5, wherein:
    the Java™ GUI is coupled to the interprocess communication level communication input connection via a network.

7. A server according to claim 1, further comprising:
    an Applications Programmer Interface (API) coupled to the input and output interprocess communication streams and coupled to a database.

8. A server according to claim 1, further comprising:
    an Applications Programmer Interface (API) coupled to the input and output interprocess communication streams and coupled to a database, wherein:

the input and output interprocess communication streams communicate a database query to the API;

the API further includes:

executable program code for executing the database query; executable program code for storing entries in a first dimension into variables for entries in a second dimension of data that are received from the database;

executable program code for formatting retrieved entries in the first dimension and storing the retrieved entries in the first dimension as a string; and executable program code for writing the formatted string to the interprocess communication output stream.

9. A server according to claim 8, wherein:

the database query is a System Query Language (SQL) query.

10. A server according to claim 1, further comprising:

an Applications Programmer Interface (API) coupled to the input and output interprocess communication streams and coupled to a database, the API being selected from a group of APIs including:

a Sybase database connection API; and an Oracle database connection API.

11. A server according to claim 1, wherein:

the server is executable program code that is programmed in a Java™ programming language using a Java™ development system.

12. A server according to claim 1, wherein:

the server is executable program code that is installed for execution on a network Server.

13. A server according to claim 1, wherein:

the server is executable program code that is installed for execution on a Web Server.

14. A server according to claim 1, wherein:

the server interprocess communication creator is a server socket creator using socket-level communications; and the server interprocess communication acceptor is a server socket creator.

15. A database communication system for connecting to a database server comprising:

a computer system including executable program code implementing an application or applet;

a communication stream coupled to the computer system;

a database server coupled to the computer system via the communication stream including executable program code implementing a server for communicating data between the computer system and the database server using interprocess communication level communication; and an Applications Programmer Interface (API) coupled to the database server.

16. A server according to claim 15, wherein:

the database server is a Web Server.

17. A database communication system according to claim 15, further comprising:

a network coupled into the communication stream between the computer system and the database server.

18. A database communication system according to claim 15, wherein the executable program code implementing a server further comprises:

a generic database server type including:

a database server instantiator including executable program code for instantiating instances of the database server;

an instance of the database server type including a connection type constructor and a server interprocess communication creator; and a connection type instantiator including a server interprocess communication acceptor;

a generic connection type including:

an instance of the connection type including a database connection constructor and a interprocess communication stream creator.

19. A database communication system according to claim 18, wherein the generic connection type further includes:

a creator of input and output interprocess communication streams;

a creator of a database connection;

the database connection created by the creator and including executable program code for processing the database and formatting database information; and input and output interprocess communication streams including executable program code for transmitting the database information.

20. A database communication system according to claim 19 further comprising:

a interprocess communication level communication input connection coupled to the communication stream and coupled to the database server instantiator, the interprocess communication level communication input connection for carrying a database query, the database server instantiator being activated by the database query.

21. A database communication system according to claim 20, wherein:

the database query is a System Query Language (SQL) query.

22. A database communication system according to claim 20, wherein:

the server is a Java™ server; and the interprocess communication level communication input connection is coupled to computer system including executable program code implementing a Java™ Graphical Users Interface (GUI).

23. A database communication system according to claim 18, wherein:

the database server includes executable program code for communicating a database query to the API; and the API further includes:

executable program code for executing the database query;

executable program code for storing entries in a first dimension into variables for entries of a second dimension of data that are received from the database;

executable program code for formatting retrieved entries in the first dimension and storing the retrieved entries in the first dimension as a string; and executable program code for writing the formatted string to the interprocess communication output stream.

24. A database communication system according to claim 23, wherein:

the database query is a System Query Language (SQL) query.

25. A database communication system according to claim 18 wherein the server is a Java™ server and the API is selected from a group of APIs including:

a Sybase database connection API; and an Oracle database connection API.

26. A database communication system according to claim 15, wherein:

the server is a Java™ server; and the Java™ server is executable program code that is programmed in a Java™ programming language using a Java™ development system.

27. A server according to claim 15, wherein:

the server interprocess communication creator is a server socket creator using socket-level communications; and the server interprocess communication acceptor is a server socket creator.

28. A method of connecting an application or applet to a database comprising:

instantiating an instance of a database server type to form a database server;

constructing a connection type by the operation of the database server;

creating a server interprocess communication handler by the operation of the database server;

instantiating the connection type to form an interprocess communication acceptor;

accepting the server interprocess communication by the operation of the interprocess communication acceptor;

instantiating the connection type to form a generic connection instance;

constructing a database connection by the operation of the generic connection instance; and creating a interprocess communication stream by the operation of the generic connection instance.

29. A method according to claim 28 further comprising:

creating an input interprocess communication stream and an output interprocess communication stream; and creating a database connection for connection to the input interprocess communication stream and the output interprocess communication stream.

30. A method according to claim 29 wherein the step of creating a database connection further includes:

processing the database through the operation of the database connection;

formatting database information through the operation of the database connection; and transmitting the database information via the input interprocess communication stream and the output interprocess communication stream.

31. A method according to claim 28, further comprising:

receiving a database query; and instantiating a new instance of a database server upon receipt of the database query.

32. A method according to claim 31, wherein:

the database query is a System Query Language (SQL) query.

33. A method according to claim 28, further comprising:

generating a System Query Language (SQL) query using a Java™ Graphical Users Interface (GUI);

receiving the System Query Language (SQL) query; and instantiating a new instance of a database server upon receipt of a SQL query.

34. A method according to claim 33 further comprising:

communicating the SQL query from the Java™ GUI via a network.

35. A method according to claim 28, wherein the database connection is connected via an Applications Programmer Interface (API).

36. A method according to claim 28, wherein the database connection is connected via an Applications Programmer Interface (API), the API performing the steps of:

receiving a SQL query;

executing the SQL query in response to receipt of the SQL query;

storing entries of the SQL query in a first dimension into variables for entries of a second dimension of data that are received from the database;

formatting retrieved entries in the first dimension and storing the retrieved entries in the first dimension as a string; and writing the formatted string to the interprocess communication output stream.

37. A method according to claim 28, wherein the database connection is connected via an Applications Programmer Interface (API), the API being selected from a group of APIs including:

a Sybase database connection API; and an Oracle database connection API.

38. A method according to claim 28, wherein:

the method steps are implemented as a server in executable program code that is programmned in a Java™ programming language using a Java™ development system.

39. A method according to claim 28, wherein:

the method steps are implemented as a server in executable program code that is installed for execution on a database Server.

40. A method according to claim 28, wherein:

the method steps are implemented as a server in executable program code that is installed for execution on a Web Server.

41. A method of providing server for connecting an application or applet to a database comprising:

providing a generic database server type including:

a database server instantiator including executable program code for instantiating instances of the database server;

an instance of the database server type including a connection type constructor and a server interprocess communication creator; and a connection type instantiator including a server interprocess communication acceptor; and providing a generic connection type including:

an instance of the connection type including a database connection constructor and a interprocess communication stream creator;

a creator of input and output interprocess communication streams;

a creator of a database connection;

a database connection including executable program code for database processing and data formatting of database information; and input and output interprocess communication streams including executable program code for transmitting the database information.

42. A method of providing a database communication system for connecting with a database server comprising:

providing a computer system including executable program code implementing an application or applet;

providing a communication stream coupled to the computer system;

providing a Web server coupled to the computer system via the communication stream including executable program code implementing a server for communicating data between the computer system and the database server using interprocess communication level communication; and providing an Applications Programmer Interface (API) coupled to the Web server.

43. A method according to claim 42 further comprising:

providing executable program code implementing a server including:

providing a generic database server type including:

a database server instantiator including executable program code for instantiating instances of the database server;

an instance of the database server type including a connection type constructor and a server interprocess communication creator; and a connection type instantiator including a server interprocess communication acceptor; and providing a generic connection type including:

an instance of the connection type including a database connection constructor and a interprocess communication stream creator;

a creator of input and output interprocess communication streams;

a creator of a database connection;

a database connection including executable program code for database processing and data formatting of database information; and input and output interprocess communication streams including executable program code for transmitting the database information.

44. A computer program product comprising:

a computer usable medium having computable readable code embodied therein including a server for connecting an application or applet to a database including:

a generic database server type including:

a database server instantiator including executable program code for instantiating instances of the database server;

an instance of the database server type including a connection type constructor and a server interprocess communication creator; and a connection type instantiator including a server interprocess communication acceptor; and a generic connection type including:

an instance of the connection type including a database connection constructor and a interprocess communication stream creator;

a creator of input and output interprocess communication streams;

a creator of a database connection;

a database connection including executable program code for database processing and data formatting of database information; and input and output interprocess communication streams including executable program code for transmitting the database information.

45. A computer program product according to claim 44 wherein the computable readable code is encoded in a machine-readable form.

46. A computer program product according to claim 44 wherein the computable readable code is encoded in a human-intelligible form that is convertible into a machine-readable form.

* * * * *